United States Patent
Dressler et al.

(10) Patent No.: US 10,517,394 B2
(45) Date of Patent: Dec. 31, 2019

(54) HABITABLE MOTOR VEHICLE WITH TABLE COUPLING

(71) Applicant: REMIS Gesellschaft fuer Entwicklung und Vertrieb von technischen Elementen mbH, Cologne (DE)

(72) Inventors: Wolfgang Dressler, Cologne (DE); Semsi Hajredinaj, Duesseldorf (DE)

(73) Assignee: REMIS GESELLSCHAFT FUER ENTWICKLUNG UND VERTRIEB VON TECHNISCHEN ELEMENTEN MBH, Cologne (DE)

( * ) Notice: Subject to any disclaimer, the term of this patent is extended or adjusted under 35 U.S.C. 154(b) by 54 days.

(21) Appl. No.: 15/660,963

(22) Filed: Jul. 27, 2017

(65) Prior Publication Data

US 2018/0027960 A1   Feb. 1, 2018

(30) Foreign Application Priority Data

Jul. 29, 2016 (EP) ..................................... 16182002

(51) Int. Cl.
A47B 31/06 (2006.01)
B60P 3/36 (2006.01)

(52) U.S. Cl.
CPC ............... *A47B 31/06* (2013.01); *B60P 3/36* (2013.01)

(58) Field of Classification Search
CPC .................................. A47B 31/06; B60P 3/36
USPC ...................................................... 296/164
See application file for complete search history.

(56) References Cited

U.S. PATENT DOCUMENTS

| 3,712,662 | A |   | 1/1973 | Busby |   |
|---|---|---|---|---|---|
| 4,969,678 | A | * | 11/1990 | Loisel | B60P 3/36 224/281 |
| 5,934,726 | A |   | 8/1999 | Bossett |   |
| 7,093,888 | B2 | * | 8/2006 | Anderson | B60P 3/36 296/162 |
| 8,141,927 | B2 | * | 3/2012 | Kreil | B60P 3/34 296/165 |

FOREIGN PATENT DOCUMENTS

DE    20 2010 011 878 U1    4/2011

* cited by examiner

*Primary Examiner* — Joseph D. Pape
*Assistant Examiner* — Dana D Ivey
(74) *Attorney, Agent, or Firm* — Norman B. Thot

(57) ABSTRACT

A habitable motor vehicle includes an interior, an ambience around the vehicle, an opening between the interior and ambience, a door which closes the opening, an insect protection device fastened to the vehicle, a table, and a fastening device which is releasably fastens the table to the vehicle. The insect protection device has an insect protection screen which at least partly closes the opening. The fastening device has coupling members comprising a table coupling member arranged on the table, and a vehicle coupling member arranged on a side of the motor vehicle in a region of the opening. The table and vehicle coupling members are releasably coupled to each other. The table extends from the opening laterally into the ambience when the coupling members are coupled. An intermediate space is formed between the table and the interior having the insect protection screen arranged therein when the coupling members are coupled.

19 Claims, 4 Drawing Sheets

HABITABLE MOTOR VEHICLE WITH TABLE COUPLING

CROSS REFERENCE TO PRIOR APPLICATIONS

Priority is claimed to European Patent Application No. 16182002.2, filed Jul. 29, 2016. The entire disclosure of said application is incorporated by reference herein.

FIELD

The present invention relates to a habitable motor vehicle, such as a recreation vehicle or a motor home, comprising a fastening device for releasably fastening a table. The present invention further relates to a fastening device and a method for releasably fastening a table to a habitable motor vehicle.

BACKGROUND

Habitable motor vehicles normally comprise a vehicle interior accommodating, for example, a kitchen, a seating arrangement and/or a sleeping facility, which is accessible via at least one vehicle opening. The vehicle opening is formed between the vehicle interior and an ambience of the vehicle. The vehicle opening comprises a vehicle door frame and is closeable by a vehicle door. Depending on the given vehicle model, the vehicle opening can be arranged on a lateral side of the vehicle or at the rear of the vehicle, and the vehicle door can be designed as a swing door or a sliding door. In particular when the vehicle is used for camping, with the vehicle mostly being parked in place for several days and also the ambience of the vehicle (i.e., the area outside/around the vehicle) often being used for live-in purposes, it is particularly convenient for the occupants of the vehicle if the access to the vehicle interior from the ambience of the vehicle, and vice versa, is possible in a relatively simple and unproblematic manner, i.e., without bothersome complexity. When the vehicle is used for camping purposes, the vehicle door is therefore often left in the open position and is not be separately opened or closed for each entrance or exit.

A variety of insect protection devices exist to avoid the intrusion of insects in the opened state of the vehicle door. Such an insect protection device will in most cases be retrofitted to the vehicle and comprises an insect protection screen by which the vehicle opening can be closed when required. This allows for aeration of the vehicle interior while prohibiting insects from intruding into the vehicle interior. Such an insect protection device can generally consist of a plurality of individual insect protection screen segments. For increased comfort, insect protection devices having an integrated insect protection door have also previously been described. To avoid small insect loopholes, that mostly tend to occur in the region of an insect protection frame, the insect protection device can, for example, consist of a single segment which can be spread in a full-surfaced manner across the entire vehicle opening. Such an insect protection device is described, for example, in DE 20 2010 011 878 U1.

For optimal use of the vehicle's external area and of the vehicle's ambience, respectively, for example, for camping, the vehicle is normally provided with at least one fastening device for releasably fastening a table arranged in the ambience of the vehicle. The structural strength and the stability of the table can thereby in particular be enhanced by fixation relative to the vehicle. The table can be fixed relative to the vehicle so that an undesired wobbling or tilting of the table, as often occurs in free-standing tables in the ambience of the vehicle due to an uneven ground, can be avoided, in particular for dining or for games. For camping purposes, the table can thus be placed outside the vehicle and be fastened to the vehicle and, when the vehicle is to be driven, the table can be removed and be positioned or stored within the vehicle.

The fastening device normally comprises a table coupling member arranged on the table and at least one vehicle coupling member arranged on the vehicle side, wherein the coupling members can be releasably connected to each other. The vehicle coupling member can consist of a single component or of a plurality of coupling members and, in particular in a region of the vehicle opening, is arranged on the vehicle so that the table, in a coupled state of the coupling members, extends from the vehicle opening laterally into the ambience of the vehicle. The table can thereby be arranged outside of the vehicle immediately in the region of an access to the vehicle interior and the distance from the table to the vehicle interior can in particular be held to a minimum, which is deemed convenient and comfortable by many campers. The fastening device can also be arranged on a component connected and respectively fastened to the vehicle, for example, on a furniture item in the vehicle interior, and does not necessarily need to be arranged on the vehicle body. The vehicle body, such as, for example, the outer walls, can in particular remain untouched by the fastening device so that an accessing into the vehicle body and a resultant complex mounting process for the fastening device can be avoided.

A problem in the combination of an insect protection device for closing the vehicle opening and a table fastened to the vehicle in the region of the vehicle opening resides in the fact that both devices, particularly the insect protection screen and the table fastening device, are located in the same area of the vehicle opening and, consequently, generally exclude each other in their applicability. Either the insect protection screen can thus close the vehicle opening or the table can be coupled to the vehicle.

SUMMARY

An aspect of the present invention is to provide a habitable motor vehicle which overcomes the disadvantages of the prior art and which in particular allows for the simultaneous use of an insect protection device and of a table coupled to the vehicle.

In an embodiment, the present invention provides a habitable motor vehicle which includes a vehicle interior configured to be habitable, a vehicle ambience existing around the motor vehicle, a vehicle opening arranged between the vehicle interior and vehicle ambience, a vehicle door configured to close the vehicle opening, an insect protection device fastened to the motor vehicle, a table, and a fastening device configured to releasably fasten the table to the motor vehicle. The insect protection device comprises an insect protection screen which is configured to at least partly close the vehicle opening. The fastening device comprises coupling members comprising a table coupling member arranged on the table, and at least one vehicle coupling member arranged on a side of the motor vehicle in a region of the vehicle opening. The table coupling member and the at least one vehicle coupling member are arranged so as to be releasably coupled to each other. The at least one vehicle coupling member is arranged so that, in a coupled state of the coupling members, the table extends from the vehicle opening laterally into the vehicle ambience. At least one of the coupling members is configured so that, in the coupled state of the coupling members, an intermediate space is formed between the table and the vehicle interior which has the insect protection screen arranged therein.

BRIEF DESCRIPTION OF THE DRAWINGS

The present invention is described in greater detail below on the basis of embodiments and of the drawings in which.

DETAILED DESCRIPTION

Figure 1:
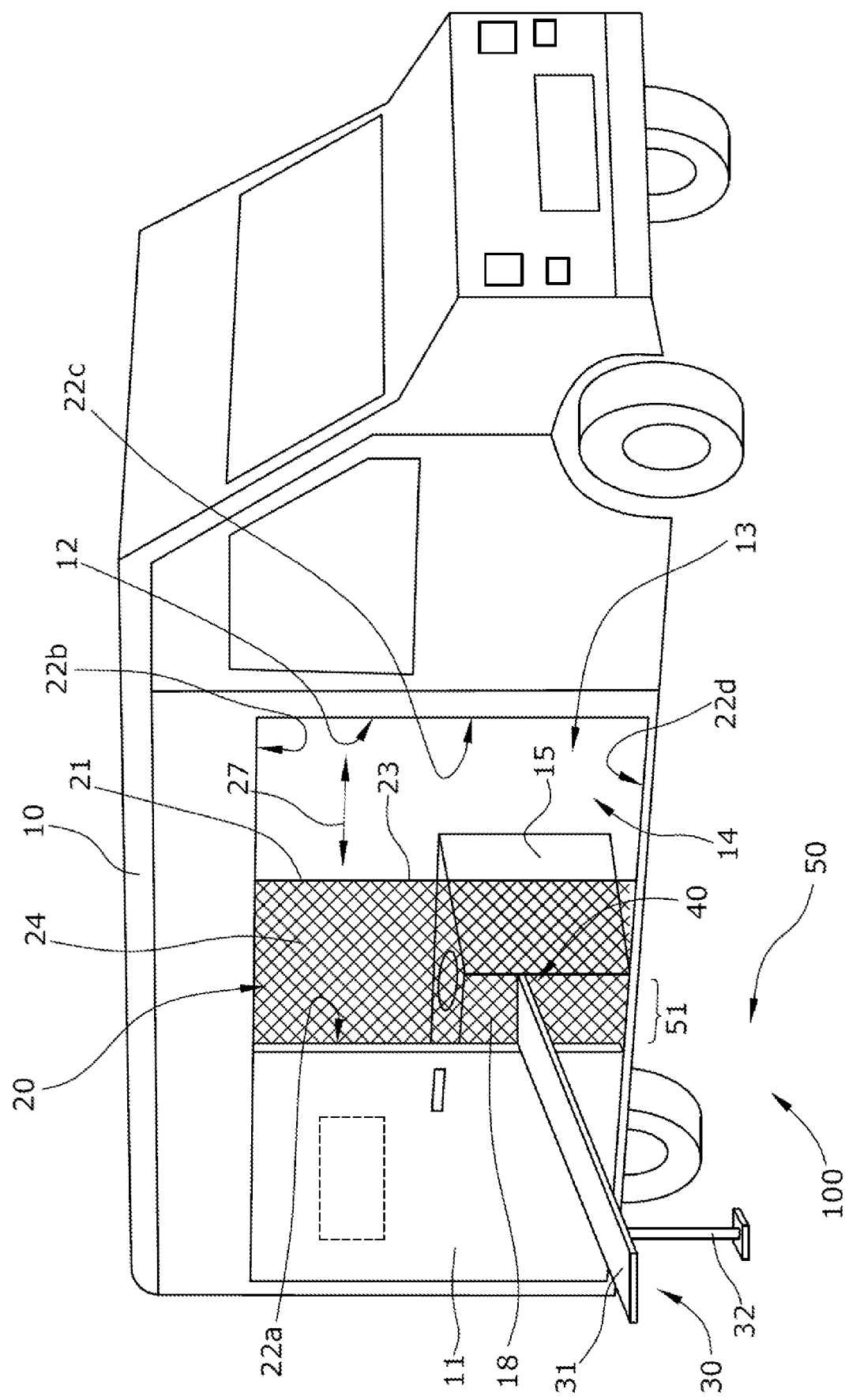
FIG. 1 is a perspective view of a habitable motor vehicle according to a first embodiment of the present invention.

According to the present invention, at least one of the coupling members of the fastening device is designed so that, in the coupled state of the coupling members, an intermediate space is formed between the table and the vehicle interior, the intermediate space having the insect protection screen arranged therein. The vehicle opening can thereby be closed by the insect protection screen also in the region of the table arrangement, and an effective shielding of the vehicle interior against insects can be achieved. The insect protection device is in particular able to close the vehicle opening across its full area via a single continuous insect protection screen, thereby reducing the total number of the insect protection frames and frame abutment faces, respectively, and thus also the number of possible loopholes for insects.

In an embodiment of the present invention, in the coupled state of the coupling members, the table can, for example, be fastened to a vehicle-interior furniture item arranged in the vehicle interior, the intermediate space being formed between the vehicle-interior furniture item and the table. The vehicle-interior furniture item can generally be any furniture item, a part of a furniture item, a board or a console that is arranged in the vehicle interior and can, for example, be is fastened to the vehicle. The vehicle-interior furniture item can, for example, be designed as a kitchen block permanently fastened to the vehicle, in particular as a kitchen cabinet. The vehicle-interior furniture item is at least partially arranged in the region of the vehicle opening. There can thereby be formed on the vehicle-interior furniture item a furniture component facing toward the vehicle opening, the furniture component in particular being a rear wall of the kitchen cabinet on which at least one of the vehicle-side coupling members is arranged for releasably fastening the table. The table can thus be fixed in a particularly simple and comfortable manner from outside the vehicle in the opened state of the vehicle door, i.e., from the ambience of the vehicle, to the vehicle coupling member arranged on the rear wall of the kitchen cabinet. The intermediate space can in particular be formed parallel to the kitchen cabinet rear wall so that the insect protection screen can be arranged between the kitchen cabinet rear wall and the table in a substantially vertical plane within the vehicle opening.

In an embodiment of the present invention, at least one coupling member can, for example, be designed as a bolt element and at least one further coupling member can, for example, be designed as a receiving element for receiving at the bolt element. The table can thereby be fastened to the vehicle in a relatively simple manner. A bolt element is to be understood in the present context to comprise any kind of a pin-shaped fastening device, for example, a pin, a splint, a bolt, a rivet, or a screw. A receiving element is to be understood herein to comprise any kind of a receiving element corresponding to the bolt element, such as, for example, a sleeve, a bore, or a thread. The fastening device can, for example, accordingly be designed as a plug-in coupling, wherein the bolt element is formed as a male plug element and the receiving element is formed as a corresponding female plug element. The table coupling member can alternatively be designed as a bolt element, and the vehicle coupling element can be designed as a receiving element. Alternatively or additionally, the vehicle coupling member can also comprise a bolt element. Two respective bolt elements and two respective receiving elements can, for example, be provided. A first bolt element can in particular be coupled to a first receiving element arranged, for example, on a vertical insect protection frame, and the second bolt element can be coupled to a second receiving element fastened, for example, on a vehicle-interior furniture item. A respective reverse arrangement of the bolt element and the receiving element is of course also possible.

For coupling the coupling members, the bolt element can extend through a passage opening provided on the insect protection screen, on an insect protection frame, or on a grip rail of the insect protection device. The passage opening can, for example, have a round shape so that the opening can be a simple bore and thus can be generated at low cost, be unobtrusive, and be place-saving.

The passage opening can be formed by a separate sleeve element which is fastened to the insect protection screen and be respectively formed therein. The bolt element can thus be passed through the insect protection screen in a relatively comfortable manner. The sleeve element can, for example, be inherently stable and comprises a through channel of continuously identical size. The through channel can, for example, be oriented substantially vertically to the extension plane of the insect protection screen at least in the tensioned state of the insect protection screen so that the bolt element which has been passed through the through channel is also arranged vertically to the extension plane of the insect protection screen.

The receiving element can comprise a first receiving section for receiving the bolt element and/or a second receiving section for receiving the sleeve element. Both the sleeve element and the bolt element can thereby be coupled to the receiving element with a precise fit and in a relatively simple manner. The sleeve element can in particular be oriented by the shape of the second receiving section and be at least partially inserted into the second receiving section. The bolt element can advantageously axially extend through the sleeve element arranged in the second receiving section and, by way of a free end in the first receiving section, be coupled to the receiving element. In accordance thereto, the sleeve element, the bolt element, and the two receiving sections are advantageously arranged coaxially to each other.

For facilitating the insertion of the sleeve element into the second receiving section, the receiving element can, for example, comprise a magnet, in particular a permanent magnet, and the sleeve element can, for example, respectively comprise a ferrous and/or a ferromagnetic material. A magnetic field can thereby be generated in the closer vicinity of the receiving element by the magnet via which the sleeve element can be attracted from the closer vicinity of the receiving element to the receiving element, be oriented, be automatically inserted, and respectively coupled into the second receiving section. A particularly convenient coupling of the sleeve element to the receiving element is thereby rendered possible.

In an embodiment of the present invention, at least one vehicle coupling member can, for example, be designed as a separate intermediate coupling member which is arranged as an interface between a first coupling member and a second coupling member. The intermediate coupling member can in particular be arranged between the table coupling member and a vehicle coupling member fastened on the vehicle side, for example, on a vehicle door frame and/or on the insect protection device, the vehicle coupling member being, for example, the receiving element. The intermediate coupling member can, for example, be released from both adjacent coupling members so that, for example, for closing the vehicle door, the intermediate coupling member can be removed from the vehicle coupling member, be separately stored and/or at least be brought into a predetermined position. The intermediate coupling member can, for example, be folded or shifted into a storage position. The fastening device can thus be used in different vehicle models.

The intermediate coupling member can be formed as a support rail. A relatively high stability of the intermediate coupling member can be achieved thereby. The support rail can, for example, be coupled on the vehicle side by at least one bolt element to the vehicle coupling member such as, for example, a thread in a bore, the support rail comprising a hooking section in which the table, with the aid of a corresponding table coupling member, in particular a hooking element, can be hung and respectively hooked into the support rail in a relatively simple manner. Various hooking positions for coupling the table to the support rail can thereby be provided on the support rail. A longitudinal hole is advantageously formed on the support rail in the lengthwise extension thereof in which a second bolt element is arranged for fixing the support rail. The support rail can thereby be coupled to a corresponding receiving element by the bolt element in an area delimited by the longitudinal hole. The displaceable bolt element can be secured against dropping out of the longitudinal hole, for example, by a web projecting radially outward on the bolt element.

The intermediate coupling member can, for example, be supported to be pivoted about a pivot axis. The intermediate coupling member formed as a support rail can thereby in particular be pivoted between a storage position in which the support rail is oriented vertically, and a console position in which the support rail is oriented horizontally for hooking attachment of the table. The pivot axis can advantageously be arranged vertically to the extension plane of the insect protection screen so that the intermediate coupling member can be pivoted, for example, from a lateral vehicle door frame into the region of the vehicle opening.

The intermediate coupling member can advantageously be arranged on the side of the intermediate space facing toward the ambience of the vehicle. The intermediate coupling member formed as a support rail is thus in particular easily accessible from the ambience of the vehicle for allowing an establishment of the hooking attachment of the table so that, by use of the table coupling member, the table can be hung into the hooking section of the support rail independently of the position of the insect protection screen and in a relatively convenient manner.

In an embodiment of the present invention, the intermediate coupling member and/or the vehicle coupling member can, for example, be U-shaped. In such a case, the U-shaped design can relate to a profile cross section or the overall shape of the intermediate coupling member and respectively of the vehicle coupling member. The intermediate coupling member formed as a support rail can, for example, have a U-shaped profile in cross section. The support rail can thereby have a particularly high inherent stiffness and stability. A further advantageous profile shape of the intermediate coupling member and/or the vehicle coupling member is a round cross section. This obviates the need to provide an abutment edge. The entire vehicle coupling member can alternatively or additionally have a U-shape wherein the two free legs of the U-profile can surround the intermediate space for arrangement of the insect protection screen. The intermediate space can in particular be arranged between the two legs, wherein one of the two legs is arranged on the vehicle-interior side of the intermediate space and the other leg is arranged on the vehicle-ambience side of the intermediate space. The vehicle-interior-side leg can thereby be fastened to the vehicle, and the vehicle-ambience-side leg can have the table fastened thereto. The vehicle-ambience-side leg is advantageously provided with a hooking section for hooking attachment of the table coupling member for this purpose. A base of the U-profile, connecting the legs, can advantageously be arranged in the region of a vehicle door frame so that the insect protection device can be at least partially be arranged in the unilaterally open gap between the legs of the U-profile, for example, in a displaceable manner, and can close the vehicle opening. The fastening device can thereby be designed in a particularly stable and place-saving manner.

In an embodiment of the present invention, the insect protection device can, for example, comprise an insect protection frame surrounding the insect protection screen which is fastened to the vehicle door frame. The insect protection device can thereby also be retrofitted to the vehicle and in particular close the entire vehicle opening. The insect protection frame can advantageously comprise a single insect protection frame consisting of at least three side portions, wherein the side portions form a frame of inherent stability. The inherently stable insect protection frame is in particular designed to correspond to the vehicle opening so that the insect protection frame can be inserted into the vehicle opening with a precise fit. This obviates the need to arrange a plurality of individual insect protection screens and a particularly effective shielding of the interior against insects can thus be achieved.

The insect protection device can comprise an insect protection door by which the vehicle opening can be closed when required. The vehicle door can be supported in a pivotable or slideable manner and can partially or completely close the vehicle opening. The insect protection door can, for example, be designed as a sliding door. The vehicle opening can thus be closed by the insect protection door in a particularly place-saving and convenient manner. A movable frame bar or grip bar can be provided for opening and closing the insect protection door.

In case of an insect protection door designed as a sliding door, the insect protection device can, for example, comprise at least one grip bar supported in a displaceable manner in a guide rail for clamping the insect protection screen into place or for inserting it. The insect protection door can thereby be configured in a particularly place-saving manner, and the vehicle opening can be cleared or closed by the insect protection screen very quickly and conveniently. The grip bar can advantageously be arranged vertically and is supported in a horizontally oriented guide rail so that, for clamping the insect protection screen into place or for inserting it, the grip bar can be pulled from the side into a position in front of the vehicle opening. The grip bar can, for example, be displaced across the entire width of the vehicle opening so that a single insect protection door adapted to close the entire vehicle opening is there formed. A plurality of displaceable grip bars can, for example, be provided, each of the plurality of displaceable grip bars forming an insect protection door and a section of an insect protection door, respectively. A passage area of the vehicle opening for entering the vehicle interior can thereby be arranged in a relatively flexible and variable manner. For example, a first grip bar can be displaced up to the middle of the vehicle opening and be temporarily fixed there, and a second grip bar can serve as a freely displaceable insect protection door for opening or closing the passage area. The vehicle-side coupling member and/or the intermediate coupling member can in this case be arranged, for example, on the first grip bar which is temporarily fixed in the region of the fastening device. The second grip bar (in the above described arrangement of the first grip bar) can alternatively be designed not as a displaceable insect protection door, but as an insect protection door supported for rotation about a lateral frame bar and, in the closed position of the insect protection door, be in abutment on the centrally arranged first grip bar.

In an embodiment of the present invention, the insect protection screen can, for example, be foldable so that, when the grip bar is displaced, the insect protection screen will automatically be folded or unfolded together. When the insect protection door is opened by displacement of the grip bar in the direction of a lateral frame bar, the insect protection screen will in particular be inserted with accompanying folding action into, and stored in, a unilaterally open protective box formed in the frame bar, and will be stored therein. When the insect protection door is closed by displacement of the grip bar in the direction away from the lateral frame bar in which the insect protection screen is stored, the insect protection screen will be pulled out from the protective box and be automatically unfolded until, in the closed position of the insect protection door, the insect protection screen has been clamped in a full-surfaced arrangement across the vehicle opening. The insect protection device is thereby configured in a particularly place-saving manner.

The insect protection screen can advantageously extend across the entire vehicle opening. The insect protection device can in particular close the vehicle opening across the full surface thereof by a sole insect protection screen and screen segment, respectively. The total number of the lateral frames and of the abutment faces, respectively, and, thus, also the number of possible loopholes for insects, can thereby be reduced, and a particularly effective shielding of the interior against insects can be achieved.

In an embodiment of the present invention, the table can, for example, be designed as a vehicle-interior furniture item which can be arranged and fastened on an additional vehicle coupling member within the vehicle interior. The table is in particular a part of the furnishings of the vehicle interior and can be arranged and fastened on the motor vehicle alternately in at least two positions, namely, within the interior of the motor vehicle and alternatively outside the vehicle.

The fastening arrangement according to the present invention, provided for releasably fastening a table to a habitable motor vehicle, comprising the above described features related to a motor vehicle and the features related to an insect protection device, is provided to comprise a fastening device with all of the features related to a fastening device. It is in particular provided that, in the coupled state of the coupling members, there is arranged an insect protection door extending across the entire insect protection door between the table and the vehicle interior.

The method of the present invention to releasably fasten a table to a habitable motor vehicle includes the steps of: opening a vehicle door for clearing a vehicle opening between a vehicle interior and an ambience of the vehicle, closing at least a partial region of the vehicle opening by placement of an insect protection screen of an insect protection device, wherein, in the closing process, in particular while the insect protection screen is pulled past a vehicle coupling member arranged on a vehicle-interior furniture item, a ferromagnetic sleeve element arranged on the insect protection screen is magnetically attracted by the vehicle coupling member and is automatically coupled to the vehicle coupling member, pivoting an intermediate coupling member designed as a support rail from a vertical orientation into a horizontal orientation, passing a bolt element moveably supported on the intermediate coupling member through the sleeve element into the vehicle coupling member, and hanging the table by a table coupling member onto the intermediate coupling member.

The present invention will be explained in greater detail below by way of two embodiments with reference to the accompanying drawings.

Figure 2:
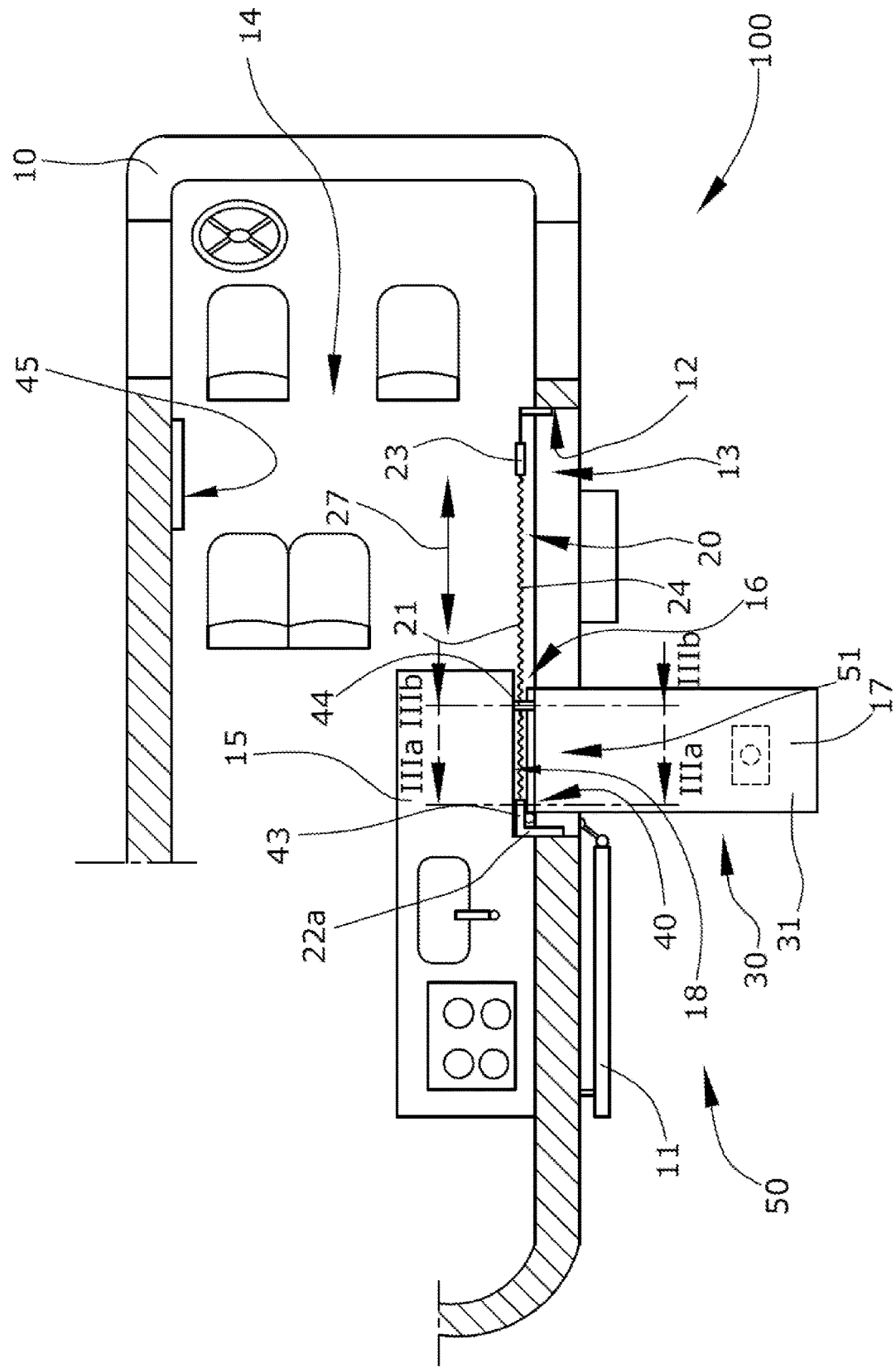
FIG. 2 shows a part of a motor vehicle as seen in sectional plan view.

FIGS. 1 and 2 show an example of a habitable motor vehicle 10 comprising a habitable vehicle interior 14. The motor vehicle 10 is provided with, on one lateral side, a vehicle door frame 12 surrounding a cutout area or vehicle opening 13. The vehicle opening 13 is formed between the vehicle interior 14 and an ambience 50 of the vehicle and is closeable by a vehicle door 11, in the present example a lateral sliding door. The vehicle door 11 is shown in an opened state in FIGS. 1 to 5, which in the present example is a precondition for releasably fastening a table 30 in the vehicle ambience 50 on the motor vehicle 10. The vehicle ambience 50 herein is understood to be an area surrounding the motor vehicle 10.

On the vehicle opening 13, an insect protection device 20 is provided which is fastened to motor vehicle 10 and comprises an insect protection screen 24 adapted to close the vehicle opening 13. In the present example, the insect protection screen 24 only covers about half of the vehicle opening 13. The insect protection screen 24 comprises a relatively fine-meshed netting which is permeable to air but does not allow for the intrusion of insects. The insect protection screen 24 is surrounded by an insect protection frame 22 which is fastened to motor vehicle 10 in the area of the vehicle door frame 12.

The insect protection frame 22 comprises two frame bars 22a, 22c which are respectively vertically oriented and are arranged opposite to each other, and two frame bars 22b, 22d which are respectively horizontally oriented and are arranged opposite to each other. The frame bars 22a, 22c, 22b, 22d are fastened to a vehicle door frame 12 surrounding the vehicle opening 13 particularly continuously. The horizontal frame bars 22b, 22d respectively serve as a guide rail for a vertically arranged grip bar 23 which, for clamping attachment or insertion of the insect protection screen 24, is displaceably arranged in the guide rails. By displacing the grip bar 23 along the direction 27 from frame bar 22a to frame bar 22c, the insect protection screen 24 can thus be pulled completely to a position in front of the vehicle opening 13 substantially in the plane of vehicle opening 13, and thus forms a displaceable insect protection door 21 by which the vehicle opening 13 can be closed or cleared as required. It is generally possible to arrange, in a displaceably supported manner, at least one further vertically arranged grip bar in the guide rails 22b, 22d for clamping attachment or insertion of the insect protection screen 24. The insect protection screen 24 is designed to be foldable and, when the grip bar 23 is displaced, will be automatically unfolded or folded together depending on the direction 27. In an opened position of the insect protection door 21 in which the vehicle opening 13 is fully cleared, the grip bar 23 is arranged in the area of frame bar 22a, wherein the insect protection screen 24 has been stored, in a folded state, in a protective box provided on frame bar 22a (which is not illustrated in detail).

At least one vehicle-interior furniture item 15 fixedly connected to motor vehicle 10 is arranged in the vehicle interior 14, the at least one vehicle-interior furniture item 15 here being a kitchen cabinet. The kitchen cabinet 15 extends, by a section thereof, into an area 51 of vehicle opening 13 so that, on the kitchen cabinet 15, a furniture rear wall 18, in particular a kitchen cabinet rear wall, facing toward vehicle opening 13 is exposed. A fastening device 40 is arranged for releasably fastening a table 30 to the motor vehicle 10 on the kitchen cabinet rear wall 18.

The table 30 comprises a table plate 31 to which the table 30 is fastened in a releasable manner in the area 51 of vehicle opening 13 by the fastening device 40 on the exposed kitchen cabinet rear wall 18. The table 30 in FIGS. 1 to 5 is accordingly shown in a coupled state 100 in which the table 30 is fastened to motor vehicle 10 so that the table 30 extends from the vehicle opening 13 into the vehicle ambience 50. The table 30 is thus positioned substantially for use outside the motor vehicle 10 and is fastened to motor vehicle 10 via fastening device 40 for enhanced structural strength and stability. For further enhancement of stability, the table 30 comprises a table leg 32 by which the table plate 31 is supported on a ground surface in the vehicle ambience 50. The use of the table 30 in the above described manner is a special function of table 30 which normally is a part of the interior furnishings of the vehicle and in particular, within the motor vehicle 10 in vehicle interior 14, is arranged in the region of a seat bench (not illustrated in the drawings). A coupling member 45 is arranged therefor on motor vehicle 10 in the region of the seat bench for releasably fastening the table 30 in the vehicle interior 14.

To make it possible to fasten the table 30 to the kitchen cabinet rear wall 18 and to use the insect protection device 20, the fastening device 40 is designed so that, in the coupled state 100 of table 30, an intermediate space 16 is formed on the kitchen cabinet rear wall 18 between the table 30 and the vehicle interior 14, the intermediate space 16 having the insect protection screen 24 arranged therein. Intermediate space 16 in the present example is formed between the table 30 and the kitchen cabinet rear wall 18. The vehicle opening 13 can thereby also be closed in the area 51 of table 30 by the insect protection screen 24, and the vehicle interior 14 can be shielded from insects in an effective manner.

Figure 3:
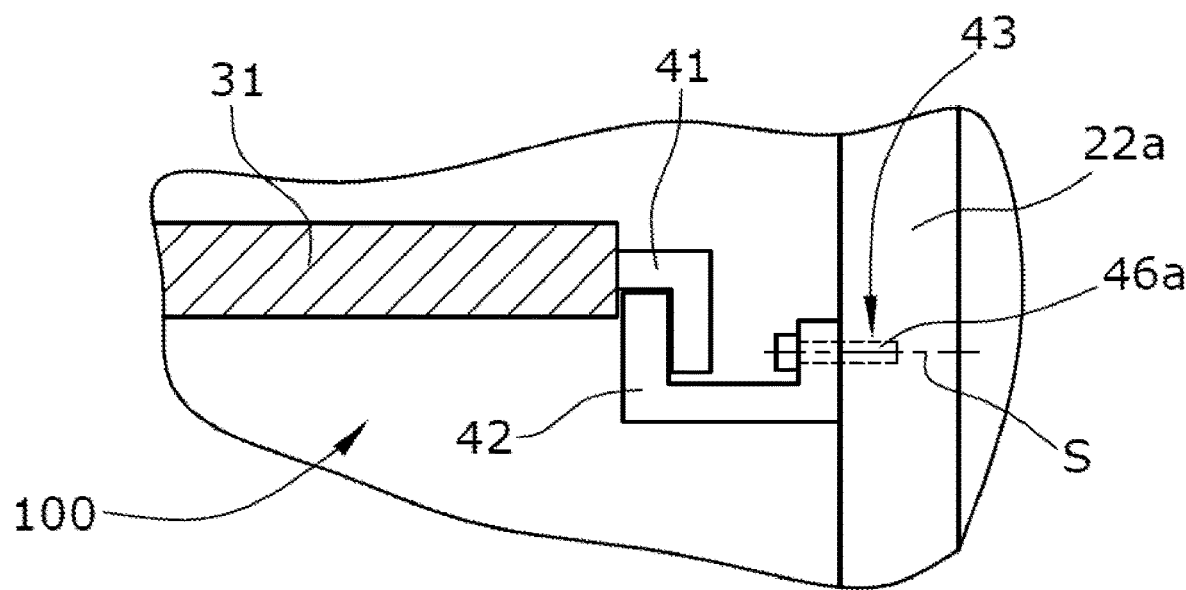
FIG. 3 shows a sectional view of a part of the fastening device.
Figure 4:
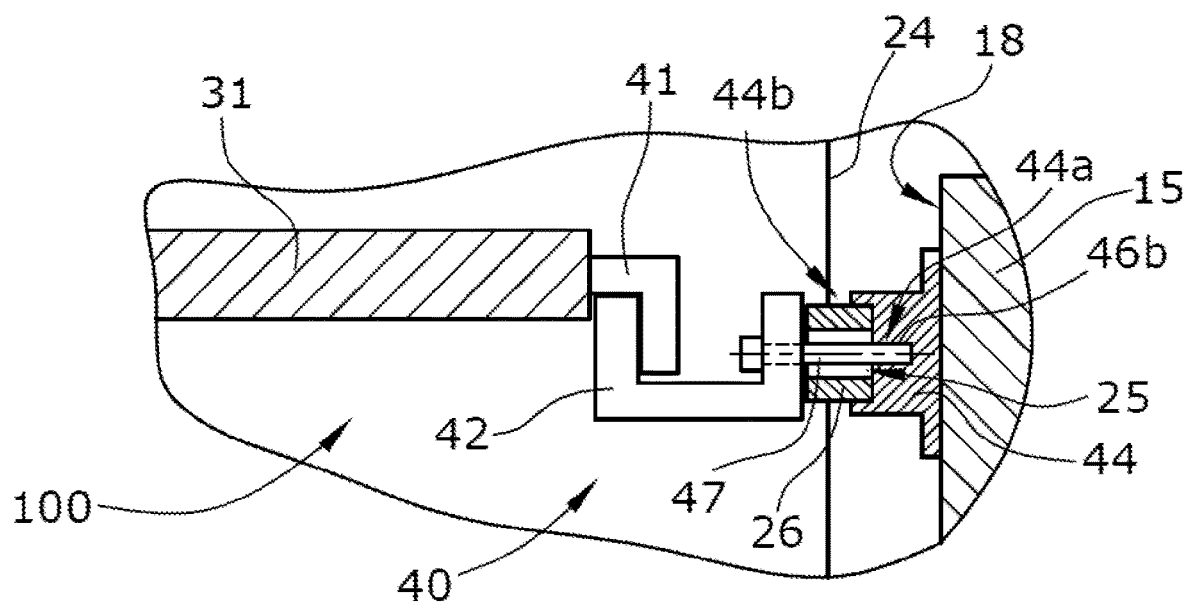
FIG. 4 shows a sectional view of a part of the fastening device.

FIGS. 3 and 4 each show a sectional partial view of fastening device 40 so that the individual coupling members 26, 41, 42, 43, 44, 45, 46a, 46b of fastening device 40 are clearly visualized. Fastening device 40 in particular comprises a table coupling member 41 arranged on table 30 and at least one vehicle coupling member 26, 42, 43, 44, 45, 46a, 46b arranged on the vehicle side, wherein the vehicle coupling members 26, 41, 42, 43, 44, 45, 46a, 46b can be releasably coupled to each other in the illustrated configuration.

FIG. 3 shows the coupling members 41, 42, 43, 46a of fastening device 40 that are arranged in a lateral region of vehicle opening 13, in particular in the area of frame bar 22a. The table coupling member 41 permanently fastened to table 30 is herein designed as a hook element which is hung from above into a vehicle coupling member 42 formed as a support rail and respectively as a console. The support rail 42 is advantageously arranged on the side of intermediate space 16 facing to the vehicle ambience 50 therefor and, when viewed in cross section, has a U-profile with an upward opening. Support rail 42 is arranged as an intermediate coupling member between two coupling members, namely between the table coupling member 41 and the receiving elements 43, 44 and, in the region shown in FIG. 3, is pivotally supported around a pivot axis S via a bolt element 46a on frame bar 22a. The bolt element 46a is coupled into a receiving opening 43 formed on frame bar 22a therefor. Bolt element 46a can, for example, be a screw, and receiving opening 43 can, for example, be a threaded bore. The support rail 42 can thus be pivoted, for example, from a first, particularly vertical position (not shown in the drawings) into a second, particularly horizontal position. The first position serves to store the support rail 42a and to clear the vehicle opening 13 when the vehicle door 11 is closed. The second position serves to hook the attachment of the table coupling member 41 in the opened state of the vehicle door 11 so that the table 30 can be coupled with the motor vehicle 10 in a relatively simple and convenient manner.

FIG. 4 shows the vehicle coupling members 26, 41, 42, 44, 46b of fastening device 40 that are arranged in a relatively central region of vehicle opening 13. The table coupling member 41 is here also hung into the support rail 42. The support rail 42 is coupled via a bolt element 46b to a vehicle coupling member 44 designed as a receiving element, wherein the receiving element 44 is fastened to the rear wall 18 of kitchen cabinet 15. The bolt element 46b in the present example can be designed as a bolt with a circumferential groove for coupling in the receiving section 44a of the receiving element 44. The bolt element 46b extends in this case by a section 47 through a passage opening 25 of a sleeve element 26 all the way into the receiving element 44.

The sleeve element 26 is formed as a separate intermediate coupling member which is permanently attached to the insect protection screen 24 and is arranged between two vehicle coupling members 42, 44, namely between support rail 42 and receiving element 44. Sleeve element 26 forms an inherently stable passage opening 25 for bolt element 46b and can advantageously be arranged in that area of insect protection screen 24 which, when the insect protection screen 24 has been completely clamped into place, is arranged in the area of receiving element 44. It can be provided that the sleeve element 46 in particular comprises a ferromagnetic material and the receiving element 44 in particular comprises a magnet so that, when the insect protection screen 24 is being clamped into place in front of the vehicle opening 13, the sleeve element 26 will be magnetically attracted by the receiving element 44 and will automatically be coupled into the receiving section 44b. The receiving section 44b and the receiving section 44a can advantageously be arranged coaxially to each other.

After the insect protection screen 24 designed as an insect protection door 21 has been at least partially clamped into place, it is consequently rendered possible, by displacing the grip bar 23, that the sleeve element 26, by the magnetic force generated by the receiving element 44, will automatically be coupled into the receiving section 44b, the support rail 42 is pivotable about the pivot axis from the vertical pre-storage position into a horizontal console position, the bolt element 46b, which is freely movable on support rail 42, can be inserted through the passage opening 25 of sleeve element 26 into the receiving section 44a and be coupled to the receiving element 44, and the table 30 can be hung into the support rail 42 by the table coupling member 41 arranged on table plate 31. Via the arrangement of the two bolt elements 46a, 46b, two support structures are formed in the present example for the support rail 42 which serve for a stable and wobble-free attachment of the table 30 to motor vehicle 10.

For releasing the table 30 from motor vehicle 10 and/or for closing the insect protection door 21, the above described sequence of steps can be performed in the reverse order, wherein the sleeve element 26, when the grip bar 23 is being pulled along, will automatically be released from the receiving section 44b by the grip bar 23 and will then be oriented corresponding to the folding of the insect protection screen 24 and, together with the folded insect protection screen 24, will be stored in a protective box formed in frame bar 22a (which is not illustrated in greater detail in the drawings).

Figure 5:
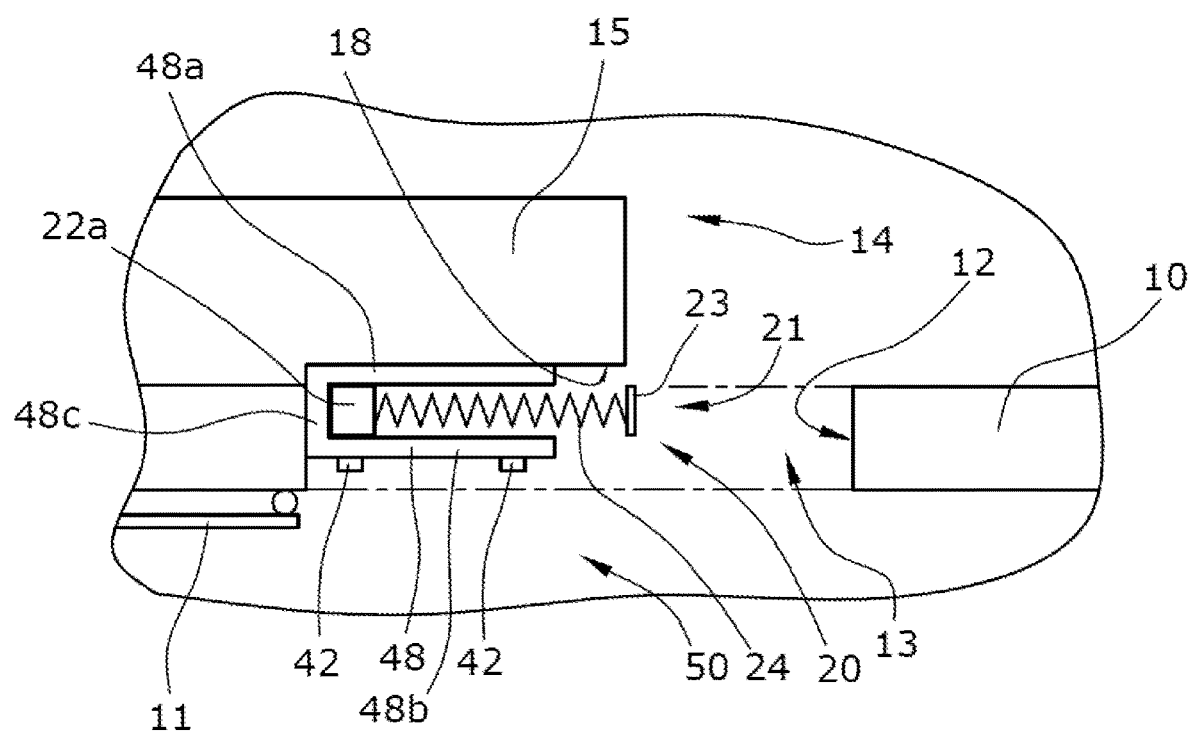
FIG. 5 shows a part of a habitable motor vehicle according to a second embodiment of the present invention as seen in sectional plan view.

FIG. 5 shows an alternative embodiment of the fastening device 40. A vehicle coupling member 48 is herein provided which is formed as an integral support and an integral bar structure, respectively. When seen in plan view, the support 48 in partiuclar has a U-shape having two substantially parallel legs 48a, 48b and a base 48c connecting the legs 48a, 48b. The height of the support 48, i.e., the vertical extension, substantially corresponds to the height of the above mentioned support rail 42 in FIGS. 1 to 4. In the present example, the support 48 surrounds the insect protection screen 24 on three sides, namely via the two legs 48a, 48b and the base 48c. The first leg 48a is arranged on the side of the insect protection screen 24 facing toward the vehicle interior 14 and is fastened to the rear wall 18 of the vehicle-interior furniture item 15. The second leg 48b is arranged on the side of the insect protection screen 24 facing toward the vehicle ambience 50 and can, for example, have its free end arranged in a cantilevered manner. In the present example, two vehicle coupling members 42 are arranged on the second leg 48b for hooking attachment of the table coupling member 41. The base 48c connecting the first leg 48a and the second leg 48b is arranged in the area of vehicle door frame 12 on the end side of insect protection screen 24. The frame bar 22a of the insect protection device 20 can be inserted into the opening of the U-shaped carrier 28. The support 48 cannot be folded out of the way in this arrangement, but remains permanently arranged in the described position. Such an arrangement is therefore only possible in such vehicle models in which sufficient space for the support 48 is also available in the closed state of the insect protection door 21. For clearer illustration, the table 30 with the table coupling member 41 is not illustrated in FIG. 5.

It should be evident that the claims are not limited to the presently described exemplary embodiments. As already mentioned, an adaptation of the coupling members to the design of the vehicle opening, the vehicle-interior furniture items and/or the insect protection device can be undertaken by the person skilled in the art. Both the number and the design of the coupling members can therefore vary. Coupling arrangements, such as, for example, the magnetic assembly for automatic attraction of a corresponding component, can also be arranged in a reverse configuration relative to each other. Reference should also be had to the appended claims.

LIST OF REFERENCE NUMERALS

10 motor vehicle
11 vehicle door
12 vehicle door frame
13 vehicle opening
14 vehicle interior
15 vehicle-interior furniture item/kitchen cabinet
16 intermediate space
17 furniture of vehicle interior
18 rear wall/kitchen cabinet rear wall/furniture rear wall
20 insect protection device
21 insect protection door
22 insect protection frame
22a (horizontal) frame bar
22b (vertical) frame bar/guide rail
22c (horizontal) frame bar
22d (vertical) frame bar/guide rail
23 grip bar
24 insect protection screen
25 passage opening
26 coupling member/sleeve element
27 direction (of displacement)
30 table
31 table plate
32 table leg
40 fastening device
41 table coupling member
42 vehicle coupling member/support rail
43 vehicle coupling member/receiving element
44 vehicle coupling member/receiving element
44a sleeve receiving section
44b bolt receiving section
45 vehicle coupling member for position in interior
46a bolt element/bolt
46b bolt element/bolt
47 section extending through screen
48 coupling member/support
48a leg
48b leg
48c base
50 ambience of vehicle
51 area of vehicle opening
100 coupled state
S pivot axis

What is claimed is:

1. A motor vehicle configured to be habitable, the motor vehicle comprising:
   a vehicle interior configured to be habitable;
   a vehicle ambience existing around the motor vehicle;
   a vehicle opening arranged between the vehicle interior and vehicle ambience;
   a vehicle door configured to close the vehicle opening;
   an insect protection device fastened to the motor vehicle, the insect protection device comprising an insect protection screen which is configured to at least partly close the vehicle opening;
   a table;
   a vehicle door frame configured to surround the vehicle opening; and
   a fastening device configured to releasably fasten the table to the motor vehicle, the fastening device comprising, coupling members comprising, a table coupling member arranged at the table, and
at least one vehicle coupling member arranged on a side of the motor vehicle in a region of the vehicle opening, wherein, the table coupling member and the at least one vehicle coupling member are arranged so as to be releasably coupled to each other, the at least one vehicle coupling member is arranged so that, in a coupled state of the coupling members, the table extends out of the vehicle opening laterally into the vehicle ambience, at least one of the coupling members is configured so that, in the coupled state of the coupling members, an intermediate space is formed between the table and the vehicle interior which intermediate space has the insect protection screen arranged therein, and the insect protection device further comprises an insect protection frame which is configured to surround the insect protection screen and to be fastened to the vehicle door frame.

2. The motor vehicle as recited in claim 1, further comprising:
a vehicle-interior furniture item arranged in the vehicle interior,
wherein,
the table is fastened to the vehicle-interior furniture item in the coupled state of the coupling members, and
the intermediate space is formed between the vehicle-interior furniture item and the table.

3. The motor vehicle as recited in claim 1, wherein,
at least one of the coupling members is designed as a bolt element, and
at least one of the coupling members is designed as a receiving element which is configured to receive the bolt element.

4. The motor vehicle as recited in claim 3, further comprising:
a through opening arranged on the insect protection screen;
an insect protection frame comprising a through opening; or
an insect protection device comprising a grip bar, the grip bar comprising a through opening,
wherein,
the bolt element is configured to extend through the through opening arranged on the insect protection screen, the through opening arranged on the insect protection frame, or through the through opening arranged on the grip bar of the insect protection device.

5. The motor vehicle of claim 4, further comprising:
a separate sleeve element fastened to the insect protection screen,
wherein,
the through opening of the insect protection screen is formed by the separate sleeve element fastened to the insect protection screen.

6. The motor vehicle as recited in claim 5, wherein the receiving element comprises at least one of a first receiving section which is configured to receive the bolt element and a second receiving section which is configured to receive the separate sleeve element.

7. The motor vehicle as recited in claim 5, wherein,
the receiving element further comprises a magnet, and
the separate sleeve element is configured to be ferromagnetic.

8. The motor vehicle as recited in claim 1, wherein
at least one of the at least one vehicle coupling member is provided as a separate intermediate coupling member,
at least one of the table coupling member and the at least one vehicle coupling member is provided as a first coupling member,
at least one of the at least one vehicle coupling member is provided as a second coupling member, and
the separate intermediate coupling member is arranged as an interface between the first coupling member and the second coupling member.

9. The motor vehicle as recited in claim 8, wherein the separate intermediate coupling member is provided as a support rail comprising at least one hooking element, the support rail being configured to provide a hooking attachment of the table coupling member via the at least one hooking element.

10. The motor vehicle as recited in claim 9, wherein the separate intermediate coupling member is configured to pivot about a pivot axis.

11. The motor vehicle as recited in claim 9, wherein the separate intermediate coupling member is arranged on a side of the intermediate space which faces toward the vehicle ambience.

12. The motor vehicle as recited in claim 8, further comprising;
a vehicle coupling member,
wherein,
at least one of the separate intermediate coupling member and the vehicle coupling member are configured to have a U-shape.

13. The motor vehicle of as recited in claim 1,
wherein,
the insect protection device comprises an insect protection door which is configured to close the vehicle opening.

14. The motor vehicle as recited in claim 1, further comprising;
a guide rail,
wherein,
the insect protection device comprises at least one grip bar arranged in the guide rail so as to be displaceable, the at least one grip bar being configured to clamp into place or to insert the insect protection screen.

15. The motor vehicle as recited in claim 14, wherein the insect protection screen is configured to automatically fold together or to unfold upon the displacement of the at least one grip bar.

16. The motor vehicle as recited in claim 1, wherein the insect protection screen is configured to extend completely across the vehicle opening.

17. The motor vehicle as recited in claim 1, further comprising:
an additional vehicle coupling member arranged within the vehicle interior,
wherein,
the table is provided as a vehicle-interior furniture item which is configured to be arranged on and fastened to the additional vehicle coupling member.

18. The fastening device as recited in claim 1.

19. A method for releasably fastening a table to a motor vehicle which is configured to be habitable, the method comprising:
opening a vehicle door so as to clear a vehicle opening arranged between a vehicle interior and a vehicle ambience existing around the motor vehicle;

closing at least a part of the vehicle opening via a placement of an insect protection screen of an insect protection device, wherein, during the closing,
- when the insect protection screen is pulled past a vehicle coupling member arranged on a vehicle-interior furniture item,
- a sleeve element arranged on the insect protection screen is automatically magnetically attracted by the vehicle coupling member so as to be coupled thereto;

pivoting an intermediate coupling member provided as a support rail from a vertical orientation into a horizontal orientation;

passing a bolt element which is configured to be moveably supported on the intermediate coupling member through the sleeve element into the vehicle coupling member; and hanging the table via a table coupling member onto the intermediate coupling member.

\* \* \* \* \*